United States Patent
Kim

(10) Patent No.: US 9,780,699 B2
(45) Date of Patent: Oct. 3, 2017

(54) MOTOR PROTECTION RELAY AND METHOD FOR STARTING MOTOR OF MOTOR PROTECTION RELAY

(71) Applicant: LSIS CO., LTD., Anyang-si, Gyeonggi-do (KR)

(72) Inventor: Kyungho Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 3 days.

(21) Appl. No.: 14/986,056

(22) Filed: Dec. 31, 2015

(65) Prior Publication Data

US 2016/0268934 A1    Sep. 15, 2016

(30) Foreign Application Priority Data

Mar. 11, 2015    (KR) .................. 10-2015-0033874

(51) Int. Cl.
   *H02H 7/08*    (2006.01)
   *H02P 1/04*    (2006.01)
   *H02P 1/02*    (2006.01)

(52) U.S. Cl.
   CPC ............... *H02P 1/04* (2013.01); *H02P 1/028* (2013.01)

(58) Field of Classification Search
   CPC .. G08B 21/00; H02H 7/08; H02P 1/00; H02P 3/00; H02P 5/00; H02P 23/00; H02P 7/00; H02P 8/00; H02P 1/04
   USPC ......... 318/400.01, 400.14, 400.15, 700, 727, 318/799, 801, 430, 432, 437, 599; 361/1, 361/2, 22, 23, 160, 166, 56, 57, 62, 89, 361/90, 91.1
   See application file for complete search history.

(56) References Cited

U.S. PATENT DOCUMENTS

| | | | |
|---|---|---|---|
| 6,650,245 B2 * | 11/2003 | Chung ............... | H01H 9/542 318/757 |
| 8,279,565 B2 * | 10/2012 | Hall .................... | H02H 7/0816 318/432 |
| 8,674,650 B1 | 3/2014 | Rabinovich | |
| 2002/0093774 A1 | 7/2002 | Chung | |

FOREIGN PATENT DOCUMENTS

| | | |
|---|---|---|
| JP | 2003009582 | 1/2003 |
| KR | 10-2004-0076376 | 9/2004 |
| KR | 10-2004-0076378 | 9/2004 |

OTHER PUBLICATIONS

European Patent Office Application Serial No. 15203049.0, Search Report dated Sep. 23, 2016, 56 pages.

(Continued)

*Primary Examiner* — Antony M Paul
(74) *Attorney, Agent, or Firm* — Lee Hong Degerman Kang & Waimey

(57) ABSTRACT

The present disclosure relates to a motor protection relay and a method for starting a motor of the motor protection relay, and particularly, to a motor protection relay capable of softly starting a motor, without a separate starting device, and performing soft starting of the motor more stably, effectively, and simply, by variably controlling start power for starting the motor to the motor through controlling of the relay itself and supplying the variably controlled start power to the motor, and a method for starting a motor thereof.

18 Claims, 7 Drawing Sheets

(56) References Cited

OTHER PUBLICATIONS

Park, et al., "Speed Control of Induction Motor by Means of Expert PLC in Variable Load," The Korean Institute of Iluminating and Electrical Installation Engineers, Mar. 2002, 6 pages.
Korean Intellectual Property Office Application Serial No. 10-2015-0033874, Office Action dated May 30, 2016, 8 pages.

* cited by examiner t1 : Y START TIME t2 : Y-D SWITCH TIME

MOTOR PROTECTION RELAY AND METHOD FOR STARTING MOTOR OF MOTOR PROTECTION RELAY

CROSS-REFERENCE TO RELATED APPLICATION

Pursuant to 35 U.S.C. §119(a), this application claims the benefit of earlier filing date and right of priority to Korean Patent Application No. 10-2015-0033874, filed on Mar. 11, 2015, the contents of which are hereby incorporated by reference herein in its entirety.

BACKGROUND OF THE DISCLOSURE

1. Field of the Disclosure

The present disclosure relates to a motor protection relay and a method for starting a motor of the motor protection relay, and particularly, to a motor protection relay capable of softly starting a motor by variably controlling start power for starting the motor to the motor through controlling of the relay itself and supplying the variably controlled start power to the motor, and a method for starting a motor thereof.

2. Background of the Disclosure

When a motor is started, a large amount of torque is required to rotate the stopped motor at an initial stage, and thus, a start current is very large and when a motor is frequently started, a large amount of electric power is required due to a start load.

When a stopped motor is rotated, if the stopped motor may be rotated by lowering a start load, electric power may be reduced and motor loss may be prevented. Here, as a motor capacity is large, more start load and motor loss are generated. Thus, in order to drive a motor having a large capacity, a motor start device is added to outside of a protection relay to enable the motor to be slowly started to thus protect the motor. However, the related art method uses only ON/OFF start schemes by applying several sequences to an output power source.

FIGS. 1 through 3 illustrate a related art motor starting method.

FIG. 1 is a view illustrating a concept of line-start type power supply and starting.

FIG. 2 is a view illustrating a form of power supply according to the line-start scheme illustrated in FIG. 1.

FIG. 3 is a view illustrating a concept of Y-D start type power supply and starting according to the related art.

The related art line-start scheme is generally used in a load of 15 KW or less when a 3-phase motor is started, and a start force is the largest with an initial start current as 400%. Since the start current is large, the related art line-start scheme is generally used in small equipment and installation cost thereof is low. The related art light-start scheme is a scheme in which an output contact is operated as ON for starting a motor to allow a current to directly flow to the motor to start the motor as illustrated in FIG. 1.

However, as illustrated in FIG. 2, the form of power supply according to the scheme has a problem in that the motor is burdened since start power is temporarily supplied to the motor.

In the Y-D starting as illustrated in FIG. 3, 6 lines are connected, and, at the first time, a motor is started with Y (small voltage), and when a motor inertia is generated, the small voltage is changed to 88D (large voltage) to normally rotate the motor. An initial start current generally ranges from 15 kW to 45 kW, and even larger initial start current may also be used, and an initial instantaneous start load is about 340%. The Y-D scheme reduces a current to ⅓ and allows for smooth starting, compared with the line-start scheme. However, since a start force is ⅓, the Y-D start scheme is used for facilities (fans, low torque motor, and the like) having a small start load.

In addition, a reactor start scheme is also frequently used. A motor is first operated at a low voltage with low torque, and when a motor inertia is generated, a normal voltage is applied to perform a normal operation. An initial instantaneous start load is about 200%, and the reactor starting scheme is applied when a current is 30 kW or greater. Installation cost is expensive more than the line-start scheme or the Y-D scheme.

An automatic reactor start scheme uses 0V to normal voltage. At an initial instant of change in an analog manner, a start load is 100%, providing an optimal start scheme, but installation cost thereof is expensive.

Among the several start schemes, the most economical starting scheme is the Y-D starting scheme, and as a starting condition of the Y-D starting scheme, an operation connection of a 3-phase motor should be a star, that is, Y connection.

By doing that, using a delta circuit during a start time, a phase voltage of $1/\sqrt{3}=0.577$ times may be applied to start the motor, and after the motor is started, the connection may be changed into the star connection to operate the motor.

The motor does not have a separate delta or star terminal but a 3-phase coil composed of three groups is instantaneously changed to a delta connection or a star connection by using a magnet and a timer. For the delta-star starting, 3-group 3-phase magnet contactor is necessary.

Also, there is a scheme of softly starting the motor by controlling a current or a voltage by using an external soft starter. This scheme, however, is disadvantageous in that installation cost is increased due to the addition of the external soft starter, compared with other starting scheme (the line-start scheme and the Y-D start scheme).

That is, the related art motor starting techniques have the greatest problem with the implementation itself of the configurations for starting a motor.

For example, for soft starting, an additional device is required, a configuration is complicated, or a great amount of installation cost is incurred, and thus, it may be difficult to apply a technique for starting a motor or its implementation itself may be difficult.

In order to stably and effectively start a motor, soft starting of a motor is essential, and thus, a scheme for solving these limitations is required.

SUMMARY OF THE DISCLOSURE

Therefore, an aspect of the detailed description is to provide a motor protection relay capable of variably controlling start power and supplying the variably controlled start power to a motor through an internal configuration of the relay, and a method for starting a motor of the motor protection relay.

Therefore, another aspect of the detailed description is to provide a motor protection relay capable of stably, effectively, and simply performing soft starting of a motor by improving an existing scheme of soft-starting a motor, and a method for starting a motor of the motor protection relay.

The motor protection relay disclosed in the present disclosure may be a motor protection relay for protecting a motor and performing start controlling on the motor.

To achieve these and other advantages and in accordance with the purpose of this specification, as embodied and broadly described herein, a motor protection relay may include: a sensing unit configured to sense a current and a voltage of the motor; an input unit configured to generate a start signal and a stop signal regarding starting and stopping of the motor; and a control unit configured to control power supplied to the motor and variably control the start power to be supplied to the motor on the basis of the start signal.

In an embodiment of the present disclosure, the input unit may receive an ON/OFF state of an ON/OFF switch provided on the outside of the motor protection relay.

In an embodiment of the present disclosure, the control unit may compare a sensing result from the sensing unit with a preset reference, and when the sensing result exceeds the preset reference, the control unit may cut off power supplied to the motor to protect the motor, and the preset reference may be a rated cutoff reference regarding a current or a voltage of the motor.

In an embodiment of the present disclosure, the control unit may variably control the start power such that a magnitude of the start power is sequentially increased.

In an embodiment of the present disclosure, the control unit may check operating power of the motor, and variably control the start power such that a magnitude of the start power is sequentially increased until when the magnitude of the start power is equal to a magnitude of the operating power.

In an embodiment of the present disclosure, the control unit may divide the start power into at least one section in a time division manner, and may variably control the start power such that a magnitude of the start power is sequentially increased.

In an embodiment of the present disclosure, the control unit may check operating power of the motor, calculate the number of the at least one section according to a magnitude of the operating power of the motor by checking the operating power and variably control the start power such that a magnitude of the start power is sequentially increased according to the calculated number of the section.

In an embodiment of the present disclosure, the control unit may variably control the start power such that the start power divided by the at least one section in a time division manner is divided to have different magnitudes and different times.

In an embodiment of the present disclosure, the control unit may variably control the start power such that a predetermined delay time is provided between the at least one section.

In an embodiment of the present disclosure, the control unit may include a self-maintaining timer for providing the predetermined delay time between the at least one section.

In an embodiment of the present disclosure, the control unit may variably control the start power such that the at least one section is continued.

In an embodiment of the present disclosure, the control unit may variably control the start power such that a divided time of each of the at least one section is increased in proportion to a magnitude of power.

In an embodiment of the present disclosure, the control unit may include a programmable logic controller (PLC) for variably controlling the start power according to a preset sequence, and may variably control the start power through the PLC.

In an embodiment of the present disclosure, the preset sequence may be set such that a magnitude of the start power is sequentially increased according to the passage of time in which the start power is supplied to the motor and such that a supplied time is increased according to the sequentially increased magnitude of the start power In an embodiment of the present disclosure, the control unit may control operating power supplied to the motor on the basis of the stop signal such that a magnitude of the operating power is sequentially reduced.

In an embodiment of the present disclosure, the control unit may divide the operating power into at least one section in a time division manner and control a magnitude of the operating power to be sequentially reduced according to the at least one section, and control the operating power such that the operating power divided in each of the at least one section in a time division manner is divided to have different magnitudes and different times.

A method for starting a motor disclosed in the present disclosure may be a method for starting a motor of the motor protection relay.

To achieve these and other advantages and in accordance with the purpose of this specification, as embodied and broadly described herein, a method for starting a motor may include: setting a motor start function; checking operating power of the motor; setting a control reference for dividedly controlling start power for starting the motor according to a magnitude of the operating power; controlling to divide the start power according to the set control reference and supply the divided starting power to the motor; and starting the motor by the dividedly supplied start power.

In an embodiment of the present disclosure, the control reference may be a reference for dividedly controlling the start power such that a magnitude of the start power is sequentially increased, and the setting of the control reference may include: calculating the number of at least one section for dividedly controlling the start power; and setting the control reference in each of the at least one calculated section.

In an embodiment of the present disclosure, in the setting of the control reference, the control reference may be set such that start power divided by each of the at least one section is divided to have different magnitudes and different times.

In an embodiment of the present disclosure, in the setting of the control reference, the control reference may be set such that a divided time of each of the at least one section is increased in proportion to a magnitude of the start power.

In an embodiment of the present disclosure, in the controlling to divide the start power and supply the divided start power to the motor, the start power may be controlled to be divided to have a predetermined delay time between the at least one section, and supplied to the motor.

In an embodiment of the present disclosure, in the controlling to divide the start power and supply the divided start power to the motor, the start power may be controlled to be divided such that the at least one section is continued, so as to be supplied to the motor.

In an embodiment of the present disclosure, the method may further include: checking whether the motor is started; and displaying whether the motor is started and an operational state of the motor on the outside.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

The technique disclosed in the present disclosure may be applied to a motor protection relay and a method for starting a motor of the motor protection relay. However, the technique disclosed in the present disclosure is not limited thereto and may also be applied to any motor starting apparatus, a motor starting system, a motor protecting device, a motor control device, a motor starting method thereof or a method for starting a motor implemented through programming.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

First, a motor protection relay disclosed in the present disclosure will be described with reference to FIGS. 4 through 10.

Figure 1:
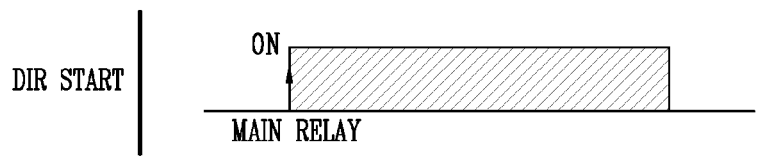
FIG. 1 is a view illustrating a concept of power supply and motor starting according to the related art line-start scheme.
Figure 2:
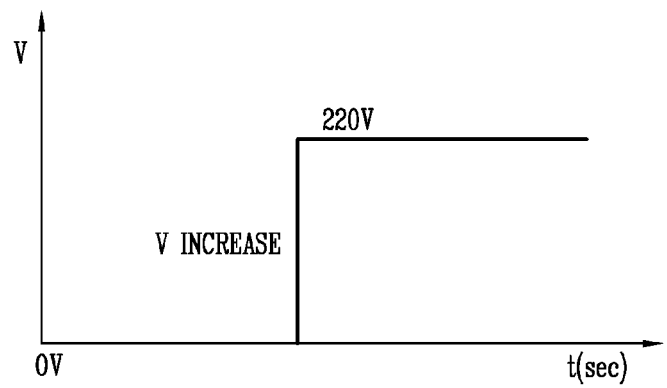
FIG. 2 is a view illustrating a form of power supply according to the line-start scheme illustrated in FIG. 1.
Figure 3:
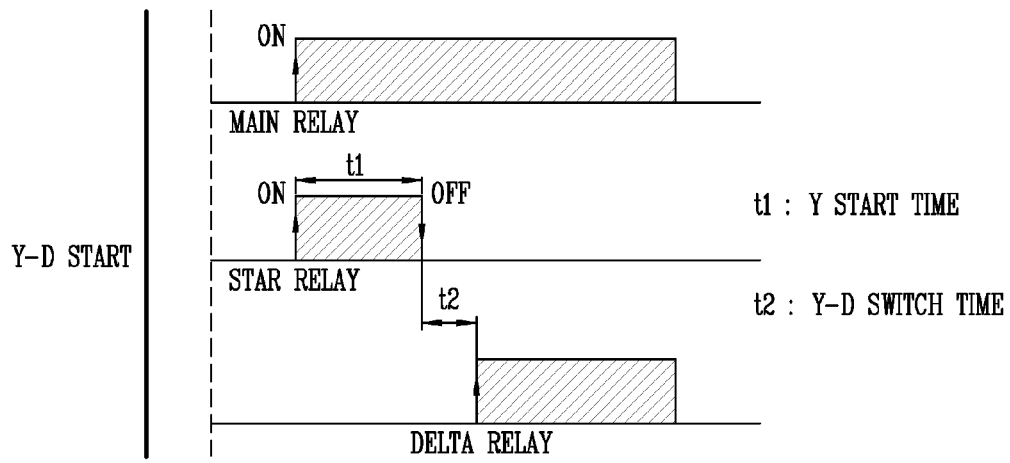
FIG. 3 is a view illustrating a concept of power supply and motor starting according to the related art Y-D start scheme.
Figure 4:
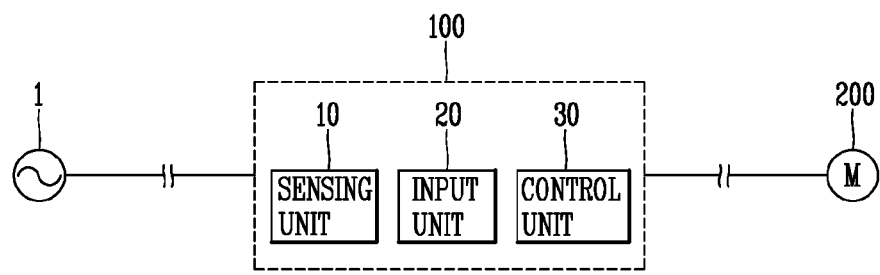
FIG. 4 is a view illustrating a configuration of a motor protection relay disclosed in the present disclosure.

FIG. 4 is a view illustrating a configuration of a motor protection relay disclosed in the present disclosure.

Figure 5:
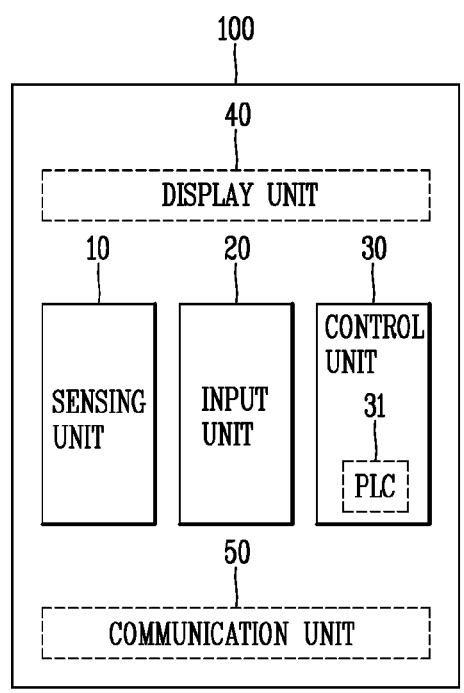
FIG. 5 is a view illustrating a configuration according to an embodiment of a motor protection relay disclosed in the present disclosure.

FIG. 5 is a view illustrating a configuration according to an embodiment of a motor protection relay disclosed in the present disclosure.

Figure 6:
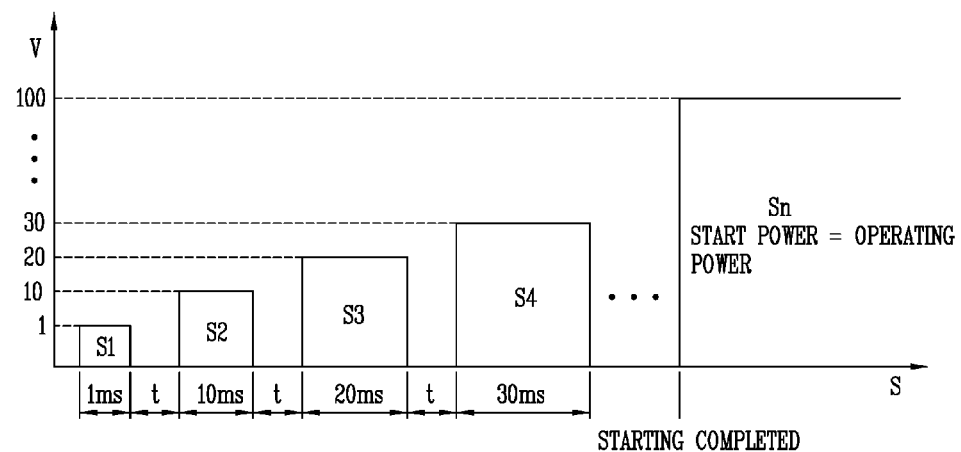
FIG. 6 is a graph 1 illustrating a variable form of start power according to an embodiment of a motor protection relay disclosed in the present disclosure.

FIG. 6 is a graph 1 illustrating a variable form of start power according to an embodiment of a motor protection relay disclosed in the present disclosure.

Figure 7:
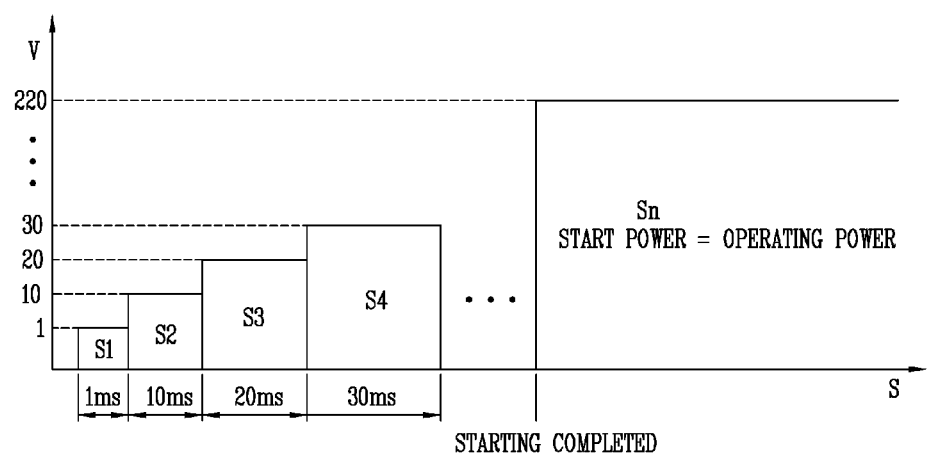
FIG. 7 is a graph 2 illustrating a variable form of start power according to an embodiment of a motor protection relay disclosed in the present disclosure.

FIG. 7 is a graph 2 illustrating a variable form of start power according to an embodiment of a motor protection relay disclosed in the present disclosure.

Figure 8:
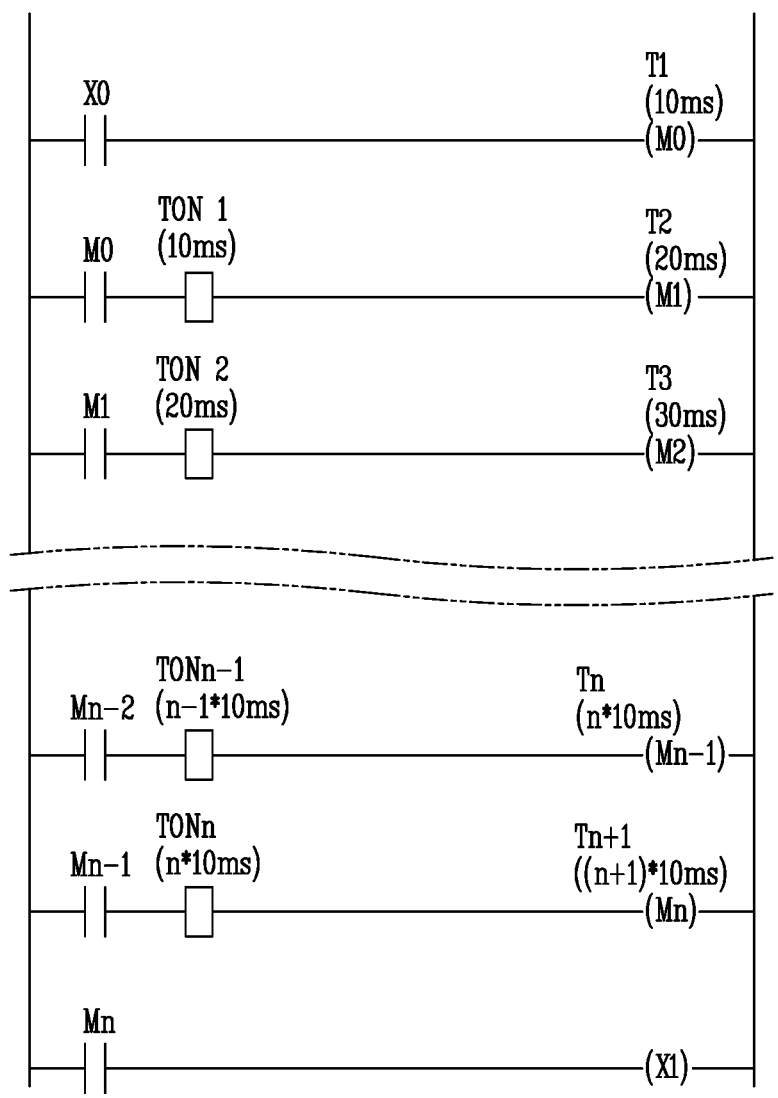
FIG. 8 is a sequence configuration view 1 illustrating a sequence of a PLC according to an embodiment of a motor protection relay disclosed in the present disclosure.

FIG. 8 is a sequence configuration view 1 illustrating a sequence of a PLC according to an embodiment of a motor protection relay disclosed in the present disclosure.

Figure 9:
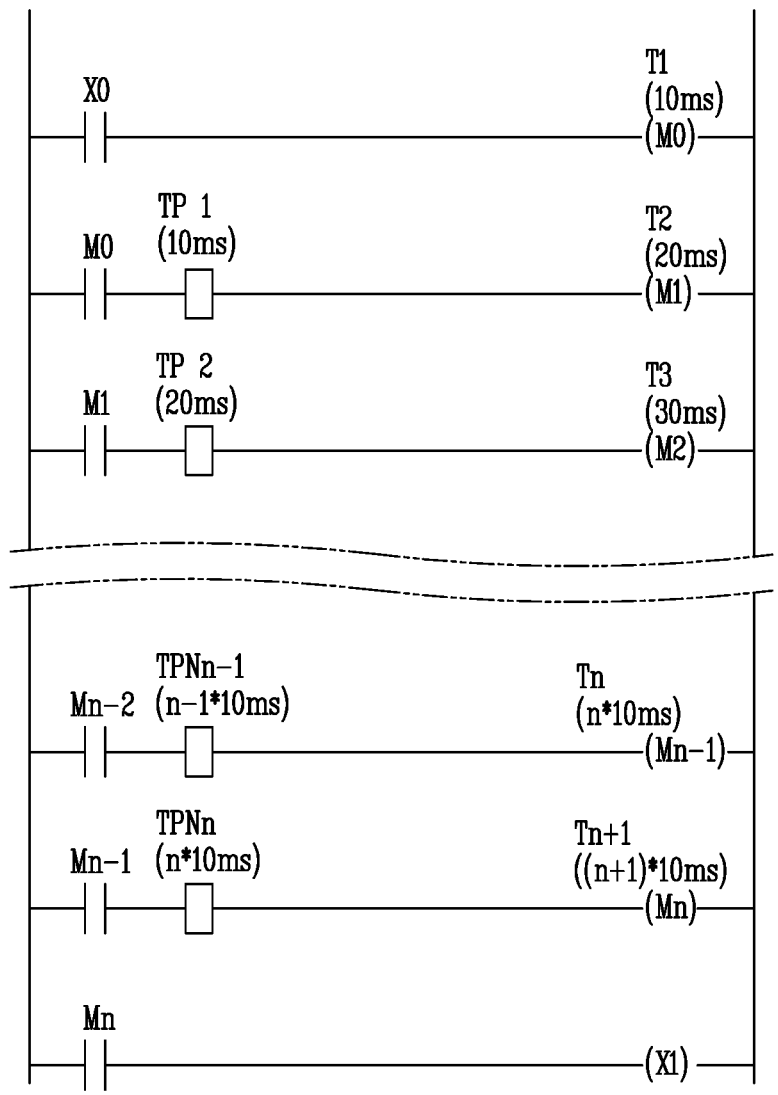
FIG. 9 is a sequence configuration view 2 illustrating a sequence of a PLC according to an embodiment of a motor protection relay disclosed in the present disclosure.

FIG. 9 is a sequence configuration view 2 illustrating a sequence of a PLC according to an embodiment of a motor protection relay disclosed in the present disclosure.

Figure 10:
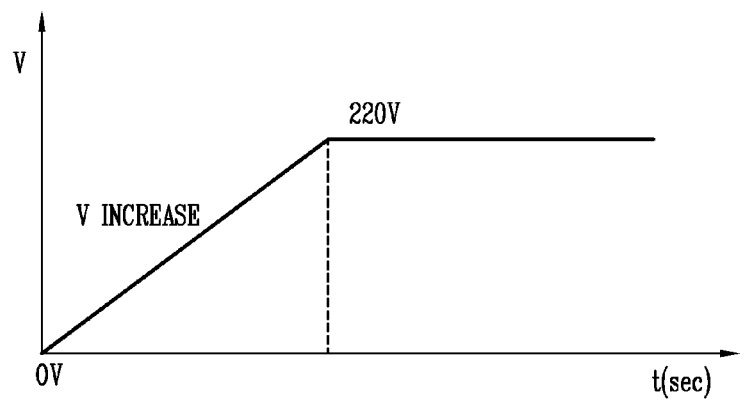
FIG. 10 is a graph illustrating a configuration of supply of start power according to an embodiment of a motor protection relay disclosed in the present disclosure.

FIG. 10 is a graph illustrating a configuration of supply of start power according to an embodiment of a motor protection relay disclosed in the present disclosure.

The motor protection relay (hereinafter, referred to as a "relay") disclosed in the present disclosure refers to a motor protection relay protecting a motor and controlling starting of the motor.

As illustrated in FIG. 4, the relay 100 includes a sensing unit 10 sensing a current and a voltage of the motor 200, an input unit 20 generating a start signal and a stop signal regarding starting and stopping of the motor 200 according to an external input, and a control unit 30 variably controlling power supplied to the motor 200 and controlling supply of start power to the motor 200 on the basis of the start signal.

The relay 100 may protect the motor 200 against an accident or a risk.

The relay 100 may start the motor 200.

A configuration according to an embodiment of the relay 100 may be the configuration illustrated in FIG. 5.

The relay 100 may be connected between an external commercial power 1 and the motor 200.

The relay 100 may be connected between the commercial power 1 and the motor 200 and supply power supplied from the commercial power 1 to the motor 200.

The sensing unit 10 senses a current and a voltage from the motor 200.

The sensing unit 10 may include a current transformer (CT) and a potential transformer (PT) capable of sensing a current and a voltage.

The sensing unit 10 may include a current detecting unit for sensing a current and a voltage detecting unit for sensing a voltage.

The sensing unit 10 may sense a current and a voltage supplied to the motor 200 and transfers the sensing result to the control unit 30 so that the control unit 30 may control power of the motor 200 according to the sensing result.

That is, the sensing unit 10 may sense a current and a voltage supplied to the motor 200 so that a protection function of the motor 200 may be performed by the control unit 30.

The input unit 20 generates a start signal and a stop signal regarding starting and stopping of the motor 200 according to an input from the outside.

Here, the outside may refer to an external interface provided to a user of the relay 100 or a manipulation switch.

The input unit 20 may input an ON/OFF state of an ON/OFF switch provided on the exterior of the relay 100.

For example, in a case in which the ON/OFF switch is turned on, the start signal may be generated, or when the ON/OFF switch is turned off, the stop signal may be generated.

That is, the ON/OFF switch may be a start switch of the motor 200.

The ON/OFF switch may refer to a switch which is able to perform ON/OF switching.

The ON/OFF switch may be a push button switch, and preferably, the ON/OFF switch may be a mechanical switch which is switched on and off.

The ON/OFF switch may be manipulated by a user of the relay 100.

The input unit 20 may generate the start signal and the stop signal according to an ON/OFF state of the ON/OFF switch as an input, and transfers the generated start signal and the stop signal to the control unit 30 so that the control unit 30 may control starting and stopping of the motor 200 according to the start signal and the stop signal.

That is, the input unit 20 may generate the start signal and the stop signal so that a motor function and a stop function of the relay 100 may be performed by the control unit 30.

The control unit 30 controls power supplied to the motor 200.

Here, the power supplied to the motor 200 may include a current and a voltage.

The control unit 30 may control power such that power supplied from the commercial power source 1 is supplied to the motor 200.

For example, the control unit 30 may control such that power is supplied to the motor 200 or power supply to the motor 200 is cut off.

The control unit 30 may compare the sensing result from the sensing unit 10 with a preset reference, and when the sensing result exceeds the preset reference, the control unit 30 may cut off power supplied to the motor 200 to protect the motor 200.

The preset reference may be a rated cutoff reference regarding a current or a voltage of the motor 200.

That is, in a case in which the sensing result exceeds the preset reference, it means that power supplied to the motor 200 exceeds a rating of the motor 200, and thus, the motor 200 may be damaged by the supplied power.

That is, in a case in which the sensing result exceeds the rated cutoff reference, it means that the power supplied to the motor 200 exceeds the rating of the motor 200, having a possibility that the motor 200 may be damaged by the supplied power.

That is, when the sensing result exceeds the rated cutoff reference of the motor 200, the control unit 30 cuts off power supplied to the motor 200 to protect the motor 200 from an accident or a risk.

The control unit 30 controls to supply start power to the motor 200 on the basis of the start signal.

The start power may refer to a start current or a start voltage for starting the motor 200.

The start power may refer to a start current or a start voltage according to types of the motor 200 or start characteristics of the motor 200.

Hereinafter, a case in which the start power is a start voltage will be described for the convenience of explanation.

However, it will be appreciated that the start power is not limited to the start voltage.

When the motor 200 is initially started, the control unit 30 may perform control to supply start power to the motor 200 in such a manner that the motor 200 is started by power supplied from the commercial power source 1.

For example, the control unit 30 may perform control such that power is not supplied to the motor 200 before the motor 200 is started, and when the motor is started, the control unit 30 may perform control to supply the start power to the motor 200 in such a manner that the motor 200 may be started.

The control unit 30 may perform control in such a manner that the start power is supplied to the motor 200 on the basis of the start signal, and here, the control unit 30 variably controls the start power.

The control unit 30 may variably control the start power in such a manner that the motor 200 may be softly start.

That is, in order to prevent the motor 200 from being burdened by the start power when the motor is started, the control unit 30 may variably control the start power to supply the power to the motor 200, to allow the motor 200 to be started softly.

The control unit 30 may variably control the start power in such a manner that a magnitude of the start power is sequentially increased.

For example, the control unit 30 may variably control the start power in such a manner that a magnitude of the start power is sequentially increased from to 1V, 5V, 10V, and to 20V according to the passage of a supply time from a point in time at which the start power is initially supplied to a point in time at which supply of the start power is completed.

The control unit 30 may variably control the start power in such a manner that the magnitude of the start power is sequentially increased according to a time duration in which the start power is supplied to the motor 200.

That is, the motor 200 may be started upon receiving the start power which has been variably controlled to be sequentially increased by the control unit 30.

The control unit 30 may check operating power of the motor 200 and variably control the start power in such a manner that the magnitude of the start power is sequentially increased until when the magnitude of the start power is equal to the magnitude of the operating power.

That is, the control unit 30 may variably control the start power in such a manner that the magnitude of the start power is sequentially increased until when it is equal to the magnitude of the operating power For example, when the operating power is 220V, the control unit 30 may variably control the start power in such a manner than the magnitude of the start power is sequentially increased until when the magnitude of the start power is changed from 0V to 220V.

In detail, for example, the control unit 30 may variably control the start power in such a manner that the magnitude of the start power is sequentially increased in order of 1V, 10V, 50V, 100V, 200V, and 220V according to the passage of supply time from a point in time at which the start power is initially supplied to a point in time at which supply of the start power is completed.

The control unit 30 may divide the start power into at least one section in a time division manner, and may variably control the start power in such a manner that the magnitude of the start power is sequentially increased according to the at least one section.

The at least one section may refer to a section in which the start power is variably controlled and supplied to the motor 200.

The at least one section may refer to a section of the start power divided in a time division manner with respect to overall time supplied to the motor 200.

For example, in a case in which time duration in which the start power is supplied to the motor 200 is 100 ms, the start power may be divided into at least one of sections of 10 ms, 20 ms, 30 ms, and 40 ms in a time division manner.

The control unit 30 may divide the start power into the at least one section in a time division manner, and here, the control unit 30 may divide the start power into the at least one section in a time division manner in such a manner that an allocation time for at least one section is sequentially increased.

For example, the at least one section may be divided in order of 10 ms, 20 ms, 30 ms, and 40 ms in a time division manner.

The control unit 30 may variably control the start power such that a magnitude of the start power is sequentially increased according to each of the at least one section divided in the time division manner.

For example, in a case in which the at least one section is divided in the time division manner as described above, the control unit 30 may variably control the start power in such a manner that the section divided into 10 ms has a magnitude of the start power as 10V, the section divided into 20 ms has a magnitude of the start power as 50V, the section divided into 30 ms has a magnitude of the start power as 100V, and the section divided into 40 ms has a magnitude of the start power as 220V.

That is, the control unit 30 may divide the start power into at least one section in a time division manner such that the magnitude of the start power is sequentially increased, and variably control the start power according to the at least one section.

That is, the magnitude of the start power may be sequentially increased according to the at least one section.

The control unit 30 may check operating power of the motor 200, calculate the number of the at least one section according to the magnitude of the operating power, and variably control the start power in such a manner that a magnitude of the start power is sequentially increased according to the number of the calculated sections.

For example, in a case in which the magnitude of the operating power is 200V, it may be calculated as four sections as in the example described above, and thus, the at least one section may be divided into four section, and when the magnitude of the operating power is 300V, one section may be further calculated in addition to the above example, and thus, the at least one section may be divided into five sections in a time division manner.

That is, the control unit 30 may divide the start power into the at least one section in a time division manner according to the number of the sections calculated according to the magnitude of the operating power, and may variably control the start power in such a manner that the magnitude of the start power is equal to the magnitude of the operating power according to the at least one section.

The control unit 30 may variably control the start power in such a manner that the start power divided into the at least one section in a time division manner is divided to have different magnitudes and different times.

That is, the start power may be variably controlled in such a manner that the at least one section is divided to have different magnitudes and different times.

For example, in a case in which the at least one section is divided into four sections in a time division manner, the start power may be variably controlled in such a manner that the first section has 10 ms and 10V, the second section has 20 ms and 50V, the third section has 30 ms and 100V, and the fourth section has 40 ms and 220V.

The control unit 30 may variably control the start power such that a predetermined delay time is provided between the at least one section.

The control unit 30 may variably control the start power such that the preset predetermined delay time is provided between the at least one section.

For example, as illustrated in FIG. 6, the control unit 30 may variably control the start power such that a delay time of t seconds is provided while the start power is variably controlled by the at least one section (S1 to Sn).

The control unit 30 may include a self-maintaining timer to have the predetermined delay time between the at least one section.

The self-maintaining timer may be a relay time switch.

The self-maintaining timer may provide the predetermined delay time to between the at least one section of the start power when the start power is divided into the at least one section and supplied to the motor 200.

That is, the control unit 30 may variably control the start power such that the start power is divided with the predetermined delay time between the at least one section by the self-maintaining timer.

The control unit 30 may variably control the start power such that the at least one section is continued.

For example, as illustrated in FIG. 7, the control unit 30 may variably control the start power such that the at least one section is continued while the start power is variably controlled in at least one section (S1 to Sn).

The control unit 30 may variably control the start power such that divided time of the at least one section is increased in proportion to the magnitude of the power.

For example, as illustrated in FIGS. 6 and 7, the control unit 30 may variably control the start power such that a divided time of each of the at least one section is increased in proportion to the magnitude of the power by setting that a divided time of the first section S1 is 1 ms, a divided time of the second section S2 is 10 ms, a divided time of the third section S3 is 20 ms, and a divided time of the fourth section S4 is 30 ms.

That is, in the start power according to the at least one section, the magnitude of the power and the divided time of the sections may be sequentially increased such that the divided time of the sections is in proportion to the magnitude of the power.

A configuration of supplying the start power according to the variable controlling by the control unit 30 described above is as shown in FIGS. 6 and 7.

Hereinafter, the configuration of supplying the start power in the aspect of the start power will be described with reference to FIGS. 6 and 7.

When the relay 100 supplies the power supplied from the commercial power source 1 to the motor 100, the control unit 30 may variably control the start power for starting the motor 200 as illustrated in FIGS. 6 and 7 and supply the variably controlled start power.

The control unit 30 of the relay 100 may variably control the start power supplied to the motor 200 to suppress the start power.

The relay 100 may enable the control unit 30 to variably control the start power such that the start power is sequentially increased and supplied to the motor 20.

The start power may be divided into the at least one section S1 to Sn and supplied to the motor 200.

The start power may be supplied with different magnitudes and at different divided times by sections.

The control unit 30 may check operating power of the motor 200, determine a reference for variably controlling the start power on the basis of the operating power, variably controlling the start power accordingly, and supply the variably controlled start power to the motor 200.

While the start power is being supplied to the motor 200, the start power may be supplied with different magnitudes and at different divided times by the at least one section such that the magnitudes and the supply times may be sequentially increased.

That is, the at least one section may be a section in which the start power is variably controlled and supplied.

In other words, the start power may be divided into the at least one section having different sizes and different divided times, and supplied such that the magnitudes of the start power are sequentially increased.

In the configuration in which the start power is variably controlled and supplied, the start power may be supplied in order at 1V for 1 ms in the first section S1, at 10V for 10 ms in the second section S2, at 20V for 20 ms in the third section S3, and at 30V for 30 ms in the fourth section S4.

In this manner, the start power may be supplied, while being sequentially increased until when the magnitude of the operating power of the motor 200 and the magnitude of the sequentially increased start power are equal (Sn).

In detail, for example, as in the supply configuration illustrated in FIG. 6, due to the self-maintaining timer included in the control unit 30, the predetermined delay time t is provided between the at least one section in which the start power is supplied, and the start power may be supplied with the predetermined delay time t.

In this configuration in which the start power is supplied to the motor 200, since the start power is supplied with the predetermined delay t between the at least one section, while being divided into the at least one section and supplied, the motor 200 may be more stably started, a start burden of the motor 200 may be reduced, and the section in which the start power is varied is reliably differentiated, whereby implementation of the scheme of variably controlling the start power in the aforementioned manner (programming, circuit element disposition, and the like) is not complicated, and thus, soft start controlling may be easily implemented.

In another specific example, as illustrated in FIG. 7, the at least one section (S1 to Sn) may be continuously supplied.

In this configuration in which the start power is supplied to the motor 200, while the start power is being divided to at least one section and supplied, since the start power is continuously supplied without a delay time between the at least one section, and thus, the motor which requires continuous power supply may be reliably started and more start controlling may be performed more softly and precisely.

The variable controlling of start power may be performed through a circuit configuration included in the control unit 30 or a programming configuration.

Hereinafter, an example of a configuration for performing variable controlling will be described with reference to FIGS. 8 and 9 further.

The control unit 30 includes a programmable logic controller (PLC) 31 for variably controlling the start power according to a preset sequence, and the control unit 30 may variably control the start power through the PLC 31.

The preset sequence may be a control sequence for variably controlling the start power such that the start power is supplied to the motor 200 is sequentially increased according to the passage of time, and here, the supply time is increased according to the magnitude of the sequentially increased start power.

That is, the PLC 31 may variably control the start power according to the preset sequence according to the preset sequence such that the start power supplied to the motor 200 is sequentially increased.

The PLC 31 may variably control the start power on the basis of the start signal.

The configuration of the preset sequence of the PLC 31 is as illustrated in FIGS. 8 and 9.

The sequence configuration illustrated in FIG. 8 corresponds to a sequence in which the supply is performed as illustrated in FIG. 6, and the sequence configuration as illustrated in FIG. 9 may correspond to a sequence in which the supply is performed as illustrated in FIG. 7.

The process of sequence illustrated in FIG. 8 will be described briefly. An input is received by X0 and 1 output (1 V) is maintained for T1 (10 ms) by M0.

Thereafter, when input (1) is received according to an algorithm, M0 output of 10 ms while the self-maintaining timer TON1 is operated for 10 ms is 0.

And then, after TON1, an output of M1 is 1 (10V) for T2 (20 ms).

When M1 is 1 again, an output of M2 is 0 while a self-maintaining timer TON2 is operated.

After TON2, an output of M2 is 1 for T3 (30 ms).

In this manner, the start power is variably controlled to be sequentially increased, while 1 and 0 of the voltage output are being repeatedly increased.

The process of sequence illustrated in FIG. 9 is a process of applying TP, instead of TON, to the sequence illustrated in FIG. 8.

In this case, the start power is sequentially increased as the at least one section is continued, while a voltage output for starting the motor is maintained.

As for a difference from the sequence illustrated in FIG. 8, when an input state is 1 (ON), TP1 is output for a preset time of 10 ms, and an output voltage of T1 is maintained while T2 is operated for 20 ms.

In this manner, when an output of the final M time is 1, start power equal to a magnitude of an operating voltage of the motor 200 is output, thus completing starting of the motor 200.

Through the configurations described above, the control unit 30 may variably control the start power such that the start power is sequentially increased, without the need to include a separate mechanical power control device.

The configuration described above with reference to FIGS. 8 and 9 illustrates an example of variable controlling of the relay 100, and the contents described above and the configurations illustrated in the drawings do not limit the scope of the present disclosure and it should be appreciated that any modifications of the foregoing contents and the matters illustrated in the drawings may implement the present disclosure described in claims.

A final configuration in which the start power is supplied as the start power is variably controlled described above may be a configuration as illustrated in FIG. 10.

When the start power is initially applied, the start power is variably controlled to be sequentially increased according to the at least one section until when the start power is equal to a magnitude of the operating power of the motor 200 so starting is completed, and finally, the supply form illustrated in FIG. 10 is obtained.

As the supply form is obtained, the motor 200 may be softly started.

The relay 100 may further include a display unit 40 and a communication unit 50.

The display unit 40 may be a display device for displaying a start process, a start state, and an operational state of the motor 200 on the outside.

The communication unit 50 may be a communication device communicating with a control device, a control system, and the like, controlling the motor 200 or the relay 100 from a remote area.

That is, the relay 100 may control power supplied to the motor 200 in a remote area through the communication unit 50.

Alternatively, an operation of the relay 100 may be controlled by other external control device.

In addition, the relay 100 may variably control even operating power supplied when the motor 200 is normally operated.

The control unit 30 may control operating power supplied to the motor 200 on the basis of the stop signal, and here, the control unit 30 may control the operating power such that a magnitude of the operating power is sequentially reduced.

That is, the relay 100 may control stopping of the motor 200, as well as starting of the motor 200.

The control unit 30 may divide the operating power into at least one section in a time division manner such that the magnitude of the operating power is sequentially reduced according to the at least one section, and may control the operating power divided according to the at least one section in a time division manner such that the operating power is divided to have different magnitudes and different times.

That is, like the scheme of variably controlling the start power, the control unit 30 may control stopping of the motor 200 by variably controlling the operating power.

Since the relay 100 controls the operating power such that the operating power is sequentially reduced, stopping of the motor 200 is softly performed, like the starting of the motor 200.

Hereinafter, a method for starting a motor of a motor protection relay disclosed in the present disclosure will be described with reference to FIGS. 11 and 12.

Figure 11:
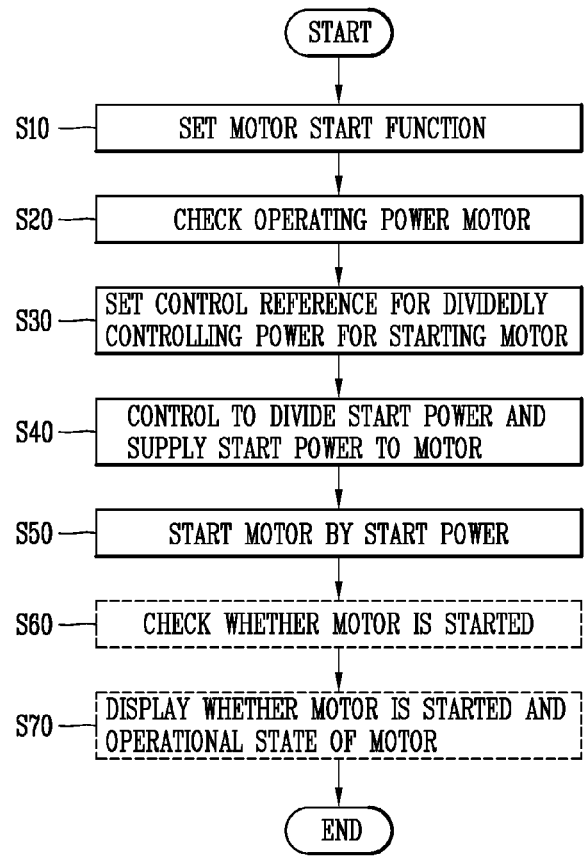
FIG. 11 is a flow chart illustrating a sequential process of a method for starting a motor disclosed in the present disclosure.

FIG. 11 is a flow chart illustrating a sequential process of a method for starting a motor disclosed in the present disclosure.

Figure 12:
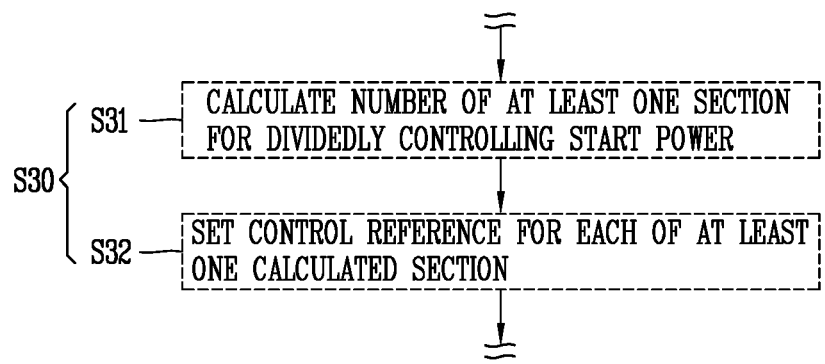
FIG. 12 is a flow chart illustrating a sequential process according to an embodiment of a method for starting a motor disclosed in the present disclosure.

FIG. 12 is a flow chart illustrating a sequential process according to an embodiment of a method for starting a motor disclosed in the present disclosure.

A method (hereinafter, will be referred to as a starting method) for starting a motor of a motor protection relay may be a method for starting a motor of the relay 100 described above.

The starting method may be a method for starting a motor of every motor protection relay for controlling power of a motor, as well as the relay 100 described above.

The starting method may be a method for starting a motor of the motor protection relay for controlling power supplied to the motor by an internal control unit or a main processing device without having a separate starting device.

In describing the starting method, descriptions of contents regarding a starting principle or a control scheme, descriptions of the same parts as those of the relay 100 described above, for example, a start principle, a control scheme, and the like, will be omitted.

As illustrated in FIG. 11, the starting method includes an operation (S10) of setting a motor start function, an operation (S20) of checking operating power of a motor, an operation (S30) of setting a control reference for dividedly controlling start power for starting the motor according to a magnitude of the operating power, an operation (S40) of dividing the start power according to the set control reference and controlling the divided start power to the motor, and an operation (S50) of starting the motor by the dividedly supplied start power.

First, the starting method may be based on the assumption that the motor as a start target is in a state of not being started yet.

In the operation (S10) of setting the motor start function, whether to start the motor to be started may be determined.

The method for setting the motor start function may be performed by operating a switch regarding starting by a user.

When the motor start function is set in the operation (S10) of setting the motor start function, start controlling of the start target motor may be started.

For example, a start signal regarding starting of the start target motor may be transferred to an internal control unit or a main processing device such that start controlling may be started.

Alternatively, the start signal may be transferred to a PLC included in the relay and start controlling may start according to the PLC.

In the operation (S20) of checking operating power of the motor, operating power required for an operation of the start target motor may be checked.

The operating power may be a control reference of the start power to be supplied to the motor.

In the operation (S30) of setting a control reference for dividedly controlling start power for starting the motor according to a magnitude of the operating power, the control reference for dividedly controlling the start power may be set on the reference of a magnitude of the operating power checked in the operation (S20) of checking operating power of the motor.

That is, the control reference may be a reference used for dividedly controlling the start power and supplying the controlled start power to the motor, and the start power may be dividedly controlled according to the control reference so as to be supplied to the motor.

The control reference may be a reference for dividedly controlling the start power such that a magnitude of the start power is sequentially increased.

That is, the start power may be dividedly controlled such that a magnitude thereof is sequentially increased, and supplied to the motor.

The operation (S30) of setting the control reference may include an operation (S31) of calculating the number of at least one section for dividedly controlling the start power and an operation (S32) of setting the control reference for each of the at least one calculated section as illustrated in FIG. 12, The at least one section may refer to a section in which the start power is dividedly controlled and supplied to the motor.

The at least one section may refer to at least one section obtained by dividing an overall time in which the start power is supplied to the motor in a time division manner.

The at least one section may be divided in a time division manner such that a magnitude and a supply time of the start power are sequentially increased.

In the operation (S31) of calculating the number of at least one section for dividedly controlling the start power, the number of the at least one section may be calculated according to a magnitude of the operating power.

That is, the start power may be divided according to the at least one section calculated on the basis of the operating power and supplied to the motor.

In the operation (S32) of setting the control reference, the control reference may be set such that start power divided for each of the at least one section is divided to have different magnitudes and different times.

That is, the start power may be dividedly controlled to have different magnitudes and different times according to each of the at least one section and supplied to the motor.

In the operation (S32) of setting the control reference, the control reference may be set such that the divided time of the at least one section is increased in proportion to the magnitude of the start power.

That is, the start power may be dividedly controlled to have different magnitudes and different times according to each of the at least one section and supplied to the motor.

The operation (S32) of setting the control reference, the control reference may be set such that the divided time for each of the at least one section is increased in proportion to the magnitude of the start power.

That is, the start power may be dividedly controlled such that a supply time provided to each of the at least one section is increased in proportion to an increase in the magnitude of the start power, so as to be supplied to the motor.

An example of setting the control reference and dividedly controlling the start power will be described. In a case in which the at least one section is divided to four sections in a time division manner, the start power may be divided such that a first section of the start power has 10V and 10 ms, a second section of the start power has 50V and 20 ms, a third section of the start power has 100V and 30 ms, and a fourth section of the start power has 220V and 40 ms, and supplied to the power.

In the operation (S40) of controlling to divide the start power and provide the divided start power to the motor, the start power may be divided such that a predetermined delay time is provided between at least one section, and supplied to the motor.

That is, the start power may be controlled to be divided into the at least one section and supplied to the motor, and a predetermined delay time may be provided between the at least one section and supplied to the motor.

According to the example, the start power may be supplied in such a form as illustrated in FIG. 6 to the motor.

Also, in the operation (S40) of controlling to divide the start power and supply the divided start power to the motor, the start power may be controlled to be divided such that the at least one section is continued, and supplied to the motor.

That is, the start power may be controlled to be divided into the at least one section and supplied to the motor, and here, the start power may be continuously supplied to the motor without a predetermined delay time between the at least one section.

The start power according to the foregoing example may be supplied in such a form as illustrated in FIG. 7 and supplied to the motor.

In the operation (S50) of starting the motor with the dividedly supplied start power, the start power is dividedly controlled in the operation (S40) of controlling to divide the start power and supply the divided start power to the motor is supplied to the motor to start the motor.

The configuration in which the start power is dividedly controlled in the process described above and supplied to the motor may be the configuration illustrated in FIG. 10.

The starting method may further include an operation (S60) of checking whether the motor is started and an operation (S70) of displaying whether the motor is started and an operational state of the motor on an outside, in addition to the operation (S50) of starting the motor by the dividedly supplied start power.

In the operation (S60) of checking whether the motor is started, whether starting of the motor has been completed through the previous steps.

In the operation (S60) of checking whether the motor is started, whether starting of the motor has been normally performed through the previous steps.

In a case in which the motor is not normally stared in the operation (S60) of checking whether the motor is started, the operation (S40) of controlling to divide the start power and supply the divided start power to the motor is performed again, whereby the starting of the motor may be normally completed.

In the operation (S70) of displaying whether the motor is started and an operational state of the motor on the outside, whether the starting of the motor has been completed may be displayed on the outside such that the user of the motor may recognize corresponding information.

The motor protection relay and the method for starting a motor of the motor protection relay disclosed in the present disclosure may also be applied to every motor starting device, motor starting system, motor protection device, motor control device, a motor starting method thereof, or a motor starting method implemented in a programming manner to which the technical concept of the present disclosure is applicable, so as to be embodied.

According to the motor protection relay and the method for starting a motor of the motor protection relay disclosed in the present disclosure, start power for starting a motor is variably controlled by controlling the relay itself and supplied to the motor, and thus, the motor may be softly started without using a separate starting device.

According to the motor protection relay and the method for starting a motor of the motor protection relay disclosed in the present disclosure, start power for starting a motor is variably controlled by controlling the relay itself and supplied to the motor, and thus, soft driving of the motor may be performed stably, effectively, and simply.

According to the motor protection relay and the method for starting a motor of the motor protection relay disclosed in the present disclosure, start power for starting a motor is variably controlled in various forms by controlling the relay itself and supplied to the motor, and thus, start controlling may be performed according to characteristics of the motor.

According to the motor protection relay and the method for starting a motor of the motor protection relay disclosed in the present disclosure, start power for starting a motor is variably controlled in various forms by controlling the relay itself and start controlling is performed according to characteristics of the motor, and thus, efficiency and compatibility of application of the motor start controlling may be increased.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is (US):

1. A motor protection relay comprising
   a sensing unit configured to sense a current and a voltage of the motor;
   an input unit configured to generate a start signal and a stop signal regarding starting and stopping of the motor; and
   a control unit configured to control power supplied to the motor and variably control the start power to be supplied to the motor on the basis of the start signal,
   wherein the control unit divides the start power into at least one section in a time division manner, and variably controls the start power such that a magnitude of the start power is sequentially increased.

2. The motor protection relay of claim 1, wherein the control unit compares a sensing result from the sensing unit with a preset reference, and when the sensing result exceeds the preset reference, the control unit cuts off power supplied to the motor to protect the motor, and
   the preset reference is a rated cutoff reference regarding a current or a voltage of the motor.

3. The motor protection relay of claim 1, wherein the control unit checks operating power of the motor, and variably controls the start power such that a magnitude of the start power is sequentially increased until when the magnitude of the start power is equal to a magnitude of the operating power.

4. The motor protection relay of claim 1, wherein the control unit checks operating power of the motor, calculates the number of the at least one section according to a magnitude of the operating power of the motor by checking the operating power, and variably controls the start power such that a magnitude of the start power is sequentially increased according to the calculated number of the section.

5. The motor protection relay of claim 1, wherein the control unit variably controls the start power such that the start power divided by the at least one section in a time division manner is divided to have different magnitudes and different times.

6. The motor protection relay of claim 1, wherein the control unit variably controls the start power such that a predetermined delay time is provided between the at least one section.

7. The motor protection relay of claim 1, wherein the control unit variably controls the start power such that the two or more sections among the at least one section are continued.

8. The motor protection relay of claim 1, wherein the control unit variably controls the start power such that a divided time of each of the at least one section is increased in proportion to a magnitude of power.

9. The motor protection relay of claim 1, wherein the control unit includes a programmable logic controller (PLC) for variably controlling the start power according to a preset sequence, and variably controls the start power through the PLC.

10. The motor protection relay of claim 9, wherein the preset sequence is set such that
    a magnitude of the start power is sequentially increased according to the passage of time in which the start power is supplied to the motor and
    such that a supplied time is increased according to the sequentially increased magnitude of the start power.

11. The motor protection relay of claim 1, wherein the control unit controls operating power supplied to the motor on the basis of the stop signal such that a magnitude of the operating power is sequentially reduced.

12. The motor protection relay of claim 11, wherein the control unit divides the operating power into at least one section in a time division manner and controls a magnitude of the operating power to be sequentially reduced according to the at least one section, and controls the operating power such that the operating power divided in each of the at least one section in a time division manner is divided to have different magnitudes and different times.

13. A method for starting a motor of a motor protection relay, the method comprising:
    setting a motor start function;
    checking operating power of the motor;
    setting a control reference for dividedly controlling start power for starting the motor according to a magnitude of the operating power;
    controlling to divide the start power according to the set control reference and supply the divided starting power to the motor; and
    starting the motor by the dividedly supplied start power.

14. The method of claim 13, wherein the control reference is a reference for dividedly controlling the start power such that a magnitude of the start power is sequentially increased, and
    the setting of the control reference comprises:
    calculating the number of at least one section for dividedly controlling the start power; and
    setting the control reference in each of the at least one calculated section.

15. The method of claim 14, wherein, in the setting of the control reference,
    the control reference is set such that start power divided by each of the at least one section is divided to have different magnitudes and different times.

16. The method of claim 15, wherein, in the setting of the control reference,
    the control reference is set such that a divided time of each of the at least one section is increased in proportion to a magnitude of the start power.

17. The method of claim 14, wherein, in the controlling to divide the start power and supply the divided start power to the motor, the start power is controlled to be divided to have a predetermined delay time between the at least one section, and supplied to the motor.

18. The method of claim 14, wherein, in the controlling to divide the start power and supply the divided start power to the motor, the start power is controlled to be divided such that the at least one section is continued, so as to be supplied to the motor.

* * * * *